(12) United States Patent
Treadway

(10) Patent No.: US 12,129,681 B2
(45) Date of Patent: Oct. 29, 2024

(54) FENCE PICKET ALIGNMENT TOOL AND METHOD OF USE

(71) Applicant: Robert Earl Treadway, Amarillo, TX (US)

(72) Inventor: Robert Earl Treadway, Amarillo, TX (US)

( * ) Notice: Subject to any disclaimer, the term of this patent is extended or adjusted under 35 U.S.C. 154(b) by 463 days.

(21) Appl. No.: 17/581,333

(22) Filed: Jan. 21, 2022

(65) Prior Publication Data

US 2022/0235574 A1    Jul. 28, 2022

Related U.S. Application Data

(60) Provisional application No. 63/140,913, filed on Jan. 24, 2021.

(51) Int. Cl.
| | | |
|---|---|---|
| *G01B 5/24* | (2006.01) | |
| *E04H 17/14* | (2006.01) | |
| *E04H 17/26* | (2006.01) | |

(52) U.S. Cl.
CPC ........... *E04H 17/26* (2013.01); *E04H 17/143* (2013.01); *G01B 5/24* (2013.01)

(58) Field of Classification Search
CPC ......... E04H 17/26; E04H 17/143; G01B 5/24; G01B 5/25
USPC ................................................... 33/613, 645
See application file for complete search history.

(56) References Cited

U.S. PATENT DOCUMENTS

| | | | | |
|---|---|---|---|---|
| 3,195,937 A * | 7/1965 | Case | .................. | E04H 17/1447 403/264 |
| 3,278,164 A * | 10/1966 | Leyendecker | ........ | E04H 17/143 256/24 |
| 3,397,866 A * | 8/1968 | Hockett | ................ | E04H 17/143 256/22 |
| 3,960,367 A * | 6/1976 | Rogers | .................. | E04H 17/143 256/65.03 |
| 6,349,924 B1 * | 2/2002 | Studebaker, Jr. | ...... | E04H 17/143 256/25 |
| 6,994,326 B1 * | 2/2006 | Tyson | .................... | E04H 17/143 256/22 |
| 7,086,642 B1 * | 8/2006 | O'Brien | .................. | E06B 11/02 256/60 |
| 7,090,202 B1 * | 8/2006 | O'Brien | ................ | E04H 17/143 256/60 |
| 7,546,691 B2 * | 6/2009 | Mackey | .................... | G01B 3/20 269/166 |
| 7,681,324 B2 * | 3/2010 | Hooks | ..................... | E04B 7/022 33/562 |
| 8,176,648 B2 * | 5/2012 | Bradley | .............. | E04G 21/1883 33/562 |

(Continued)

*Primary Examiner* — George B Bennett
(74) *Attorney, Agent, or Firm* — Shannon Warren

(57) ABSTRACT

An alignment tool for aligning and installing a plurality of pickets on a fence segment. The alignment tool comprises a body portion, and a picket level indicator. One or more upper guides and a lower guide assembly can be separated by a guide gap. The guide gap is at least as wide as a first cross member height of a first cross member of the fence segment. The alignment tool is configured to selectively attach and slide along the first cross member of the fence segment and position the picket level indicator at a selected height relative to the first cross member. The one or more upper guides and the lower guide assembly are configured to slide a forward direction and a reverse direction on the first cross member.

18 Claims, 17 Drawing Sheets

(56) References Cited

U.S. PATENT DOCUMENTS

| | | | |
|---|---|---|---|
| 8,448,348 B1* | 5/2013 | Jones | E04G 21/1891 |
| | | | 33/760 |
| 8,601,705 B2* | 12/2013 | Bierman | G01B 3/30 |
| | | | 33/613 |
| 9,631,396 B2* | 4/2017 | Leach | E04H 17/16 |
| 11,261,616 B2* | 3/2022 | Abdus-Samad | E04H 17/16 |
| 11,709,051 B2* | 7/2023 | Knudsen | E04H 17/26 |
| | | | 73/865.8 |
| 11,976,489 B2* | 5/2024 | Shen | E04H 17/1448 |
| 2005/0056821 A1* | 3/2005 | Kerr | E04H 17/143 |
| | | | 256/22 |
| 2005/0072966 A1* | 4/2005 | Bergh | E04H 17/143 |
| | | | 256/19 |
| 2005/0139815 A1* | 6/2005 | McIntosh | E04H 17/143 |
| | | | 256/65.03 |
| 2007/0085065 A1* | 4/2007 | Ramos | E04H 17/143 |
| | | | 256/59 |
| 2023/0128745 A1* | 4/2023 | Coleman | E04H 17/1413 |
| | | | 256/1 |
| 2023/0212866 A1* | 7/2023 | Krakow | G01B 5/25 |
| | | | 33/533 |

* cited by examiner

FENCE PICKET ALIGNMENT TOOL AND METHOD OF USE

CROSS-REFERENCE TO RELATED APPLICATIONS

This application claims benefit to U.S. provisional patent application No. 63/140,913, filed 2021 Jan. 24.

STATEMENT REGARDING FEDERALLY SPONSORED RESEARCH OR DEVELOPMENT (IF APPLICABLE

Not applicable.

REFERENCE TO SEQUENCE LISTING, A TABLE, OR A COMPUTER PROGRAM LISTING COMPACT DISC APPENDIX (IF APPLICABLE

Not applicable.

BACKGROUND OF THE INVENTION

In a typical fence construction setting, a builder may have trouble aligning the heights of each among a plurality of pickets 706 with one another. Merely trusting one's own eye when nailing said plurality of pickets 706 into one or more cross members 704, may lead to a fence with said plurality of pickets 706 being misaligned. Historically, this can be overcome by: installing a first picket 800 and a last picket 802, tying a string 804 between said first picket 800 and said last picket 802, and using said string 804 as a reference point to align a top edge 806 of each subsequent picket while building a fence segment 700.

Trouble arises with this method, however, because said string 804 is prone to sagging (as illustrated), reliant on the correct installation of said first picket 800 and said last picket 802, often stretches and flaps about in the wind, and can be improperly installed.

Accordingly, aligning said plurality of pickets 706 manually or using said string 804 can lead to badly aligned and sloppy workmanship when building said fence segment 700. An alignment tool 100 can be used to overcome these failures so as to simplify and improve the construction of said fence segment 700.

No prior art is known to the Applicant.

BRIEF SUMMARY OF THE INVENTION

An alignment tool for aligning and installing a plurality of pickets on a fence segment. Said alignment tool comprises a body portion, and a picket level indicator. One or more upper guides and a lower guide assembly can be separated by a guide gap. Said guide gap is at least as wide as a first cross member height of a first cross member of said fence segment. Said alignment tool is configured to selectively attach and slide along said first cross member of said fence segment and position said picket level indicator at a selected height relative to said first cross member. Said one or more upper guides and said lower guide assembly are configured to slide a forward direction and a reverse direction on said first cross member. Said alignment tool is selectively attached to said first cross member by: adjusting said guide gap between said one or more upper guides and said lower guide assembly to be substantially equal to said first cross member height of said first cross member, and squeezing said first cross member with said one or more upper guides on a cross member top edge and said lower guide assembly on a cross member bottom edge. a portion of said one or more upper guides and said lower guide assembly comprises a wheel configured to roll across a surface. Said one or more upper guides comprises a first upper wheel, and a second upper wheel. said alignment tool (100) is configured for aligning and installing said plurality of pickets on said fence segment by: selectively attaching to said first cross member of said fence segment, extending upward with said body portion from said one or more upper guides, extending outward from said body portion without said picket level indicator and defining a top edge of said plurality of pickets using a leveler lower edge of said picket level indicator at said selected height. Said lower guide assembly comprises a spring pressure configured to press a wheel portion of said lower guide assembly upward when released. Said spring pressure is configured to press said wheel portion into said cross member bottom edge of said first cross member. Said one or more upper guides is configured to support a mass of said alignment tool on said first cross member and allow said alignment tool to selectively slide among the length of said first cross member between two or more posts in said forward direction and said reverse direction. Said alignment tool is configured to selectively and slideably attach to a portion of said first cross member and hold said picket level indicator at said selected height above said first cross member.

Said alignment tool for aligning and installing said plurality of pickets on said fence segment. Said alignment tool comprises said body portion, and said picket level indicator. Said one or more upper guides and said lower guide assembly can be separated by said guide gap. Said guide gap is at least as wide as said first cross member height of said first cross member of said fence segment. Said alignment tool is configured to selectively attach and slide along said first cross member of said fence segment and position said picket level indicator at said selected height relative to said first cross member. Said one or more upper guides and said lower guide assembly are configured to slide said forward direction and said reverse direction on said first cross member. Said alignment tool is selectively attached to said first cross member by: adjusting said guide gap between said one or more upper guides and said lower guide assembly to be substantially equal to said first cross member height of said first cross member, and squeezing said first cross member with said one or more upper guides on said cross member top edge and said lower guide assembly on said cross member bottom edge.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
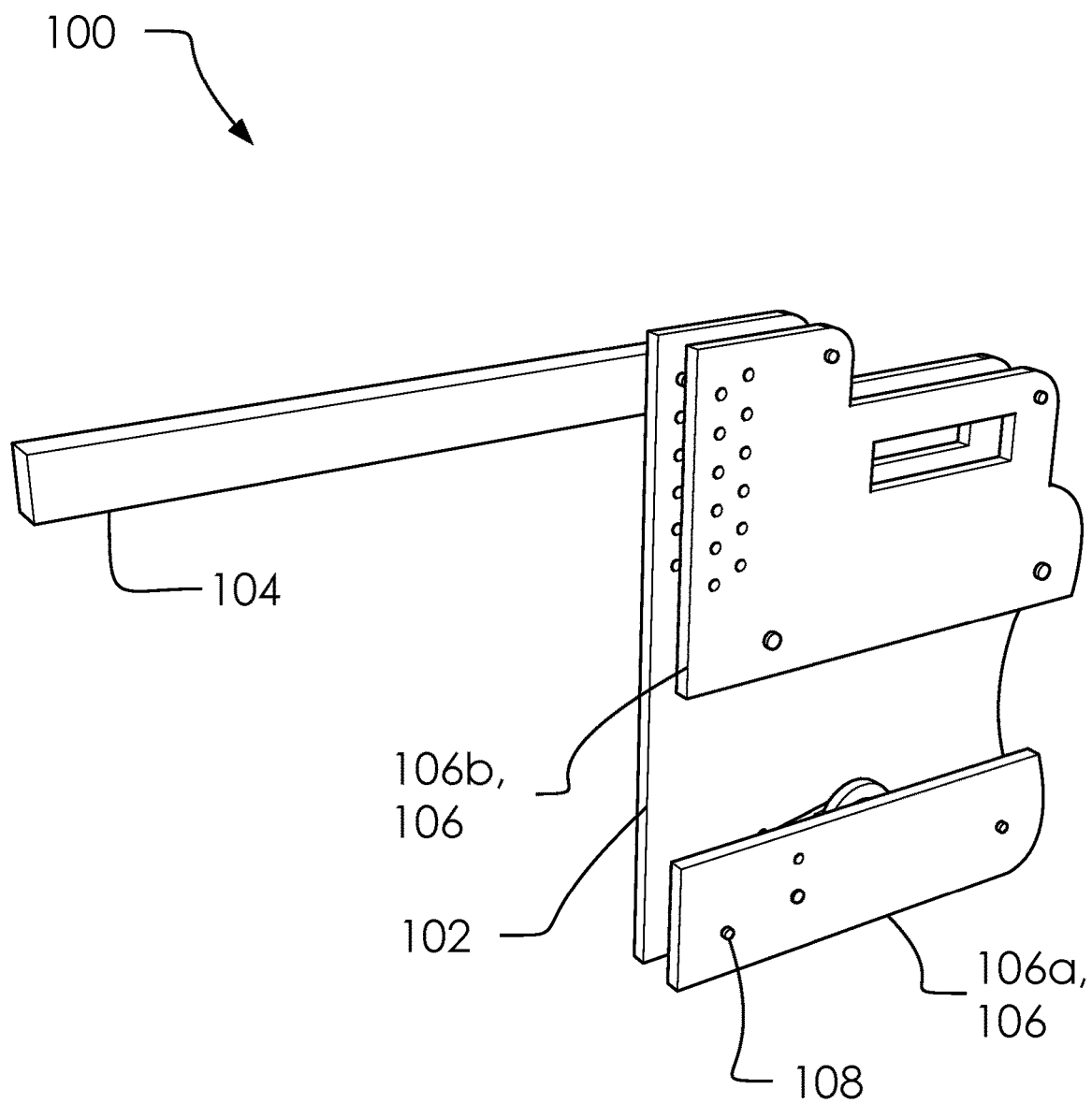
FIG. 1 illustrates a perspective overview of an alignment tool 100.

FIG. 1 illustrates a perspective overview of an alignment tool 100.

Said alignment tool 100 can comprise a body portion 102, and a picket level indicator 104. In one embodiment, said alignment tool 100 can comprise one or more front plates 106 (which can comprise a first front plate 106a, and a second front plate 106b), as illustrated. In one embodiment, portions of said body portion 102, said picket level indicator 104 and said one or more front plates 106 are selectively bound together using one or more fasteners 108.

Figure 2:
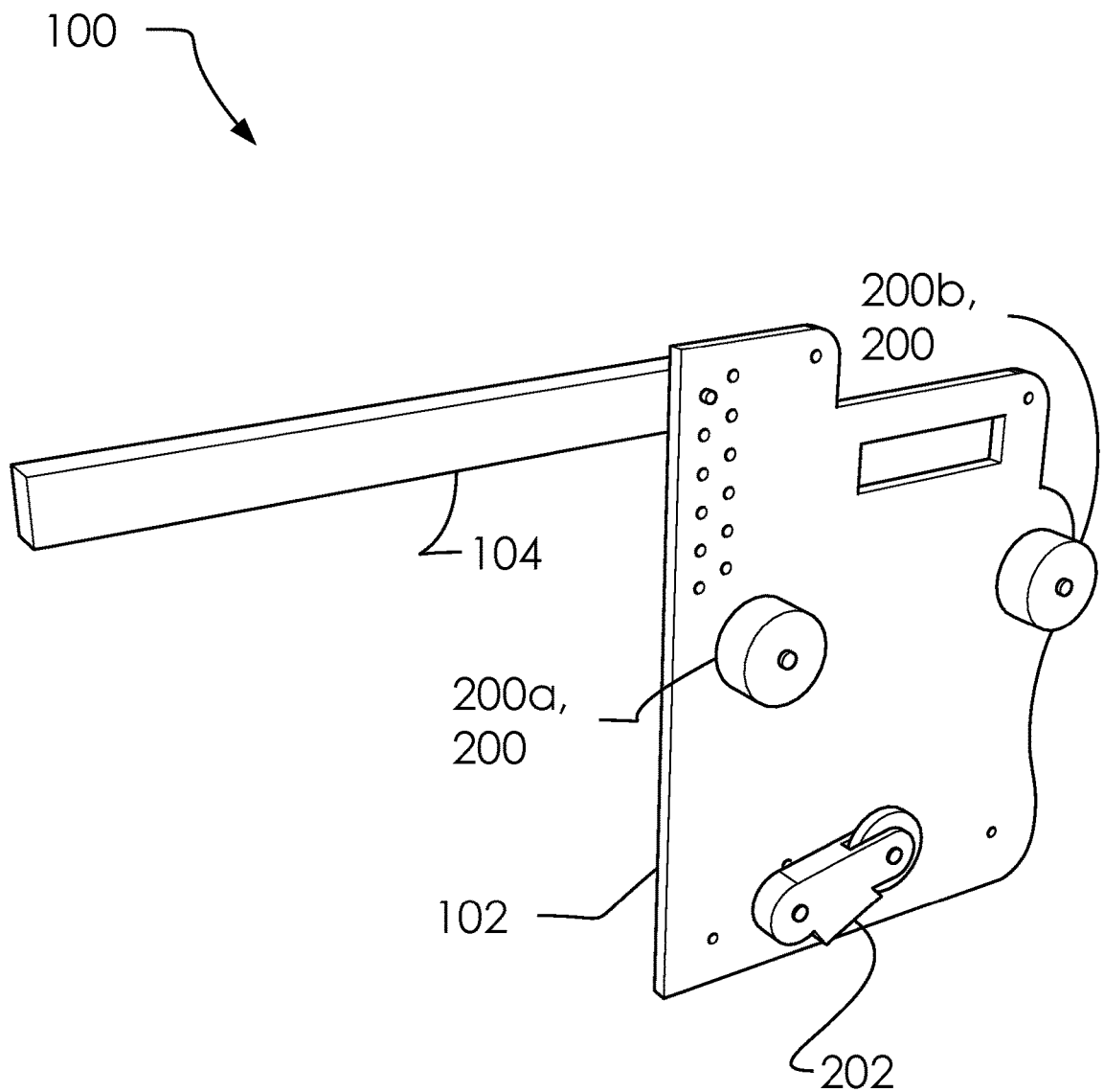
FIG. 2 illustrates said alignment tool 100 without one or more front plates 106.

FIG. 2 illustrates said alignment tool 100 without said one or more front plates 106.

In one embodiment, said alignment tool 100 can be operational without said one or more front plates 106, as discussed herein.

In one embodiment, said alignment tool 100 can comprise one or more upper guides 200 and a lower guide assembly 202. In one embodiment, a portion of said one or more upper guides 200 and said lower guide assembly 202 can comprise a wheel configured to roll across a surface. In another embodiment, said lower guide assembly 202 and said one or more upper guides 200 can comprise non-rolling elements configured to slide over a surface.

In one embodiment, said one or more upper guides 200 can comprise a first upper wheel 200a, and a second upper wheel 200b.

Figure 3A:
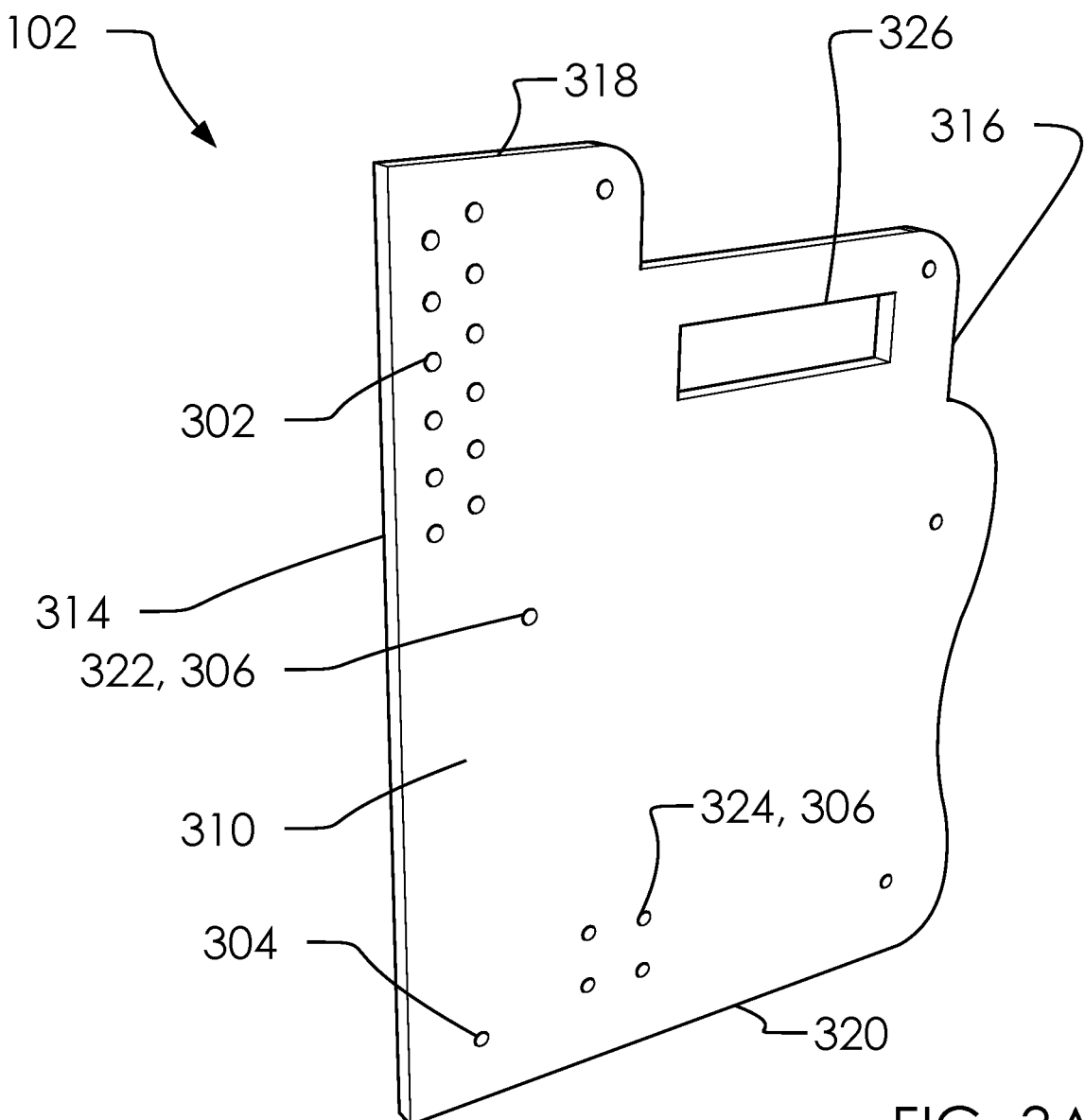
FIGS. 3A, and 3B illustrate a perspective overview of a body portion 102 from a front and rear view, respectively.
Figure 3B:
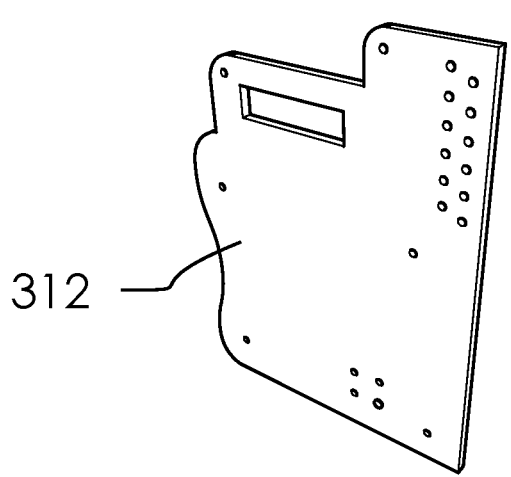

FIGS. 3A, and 3B illustrate a perspective overview of said body portion 102 from a front and rear view, respectively.

In one embodiment, said body portion 102 can comprise a plurality of apertures 300 which can comprise indicator level apertures 302, plate spacer apertures 304, and wheel axel apertures 306.

Said body portion 102 can comprise a front side 310, a back side 312, a first side edge 314, a second side edge 316, a top edge 318, and a bottom edge 320.

In one embodiment, said indicator level apertures 302 can comprise a plurality of apertures proximate to said first side edge 314 and said top edge 318.

In one embodiment, said wheel axel apertures 306 can comprise upper wheel apertures 322 configured to connect to said one or more upper guides 200; and said wheel axel apertures 306 can further comprise lower wheel apertures 324 configured to connect to said lower guide assembly 202.

In one embodiment, said alignment tool 100 can comprise a handle 326, which can comprise an aperture in a portion of said body portion 102, such as proximate to said top edge 318.

Figure 4:
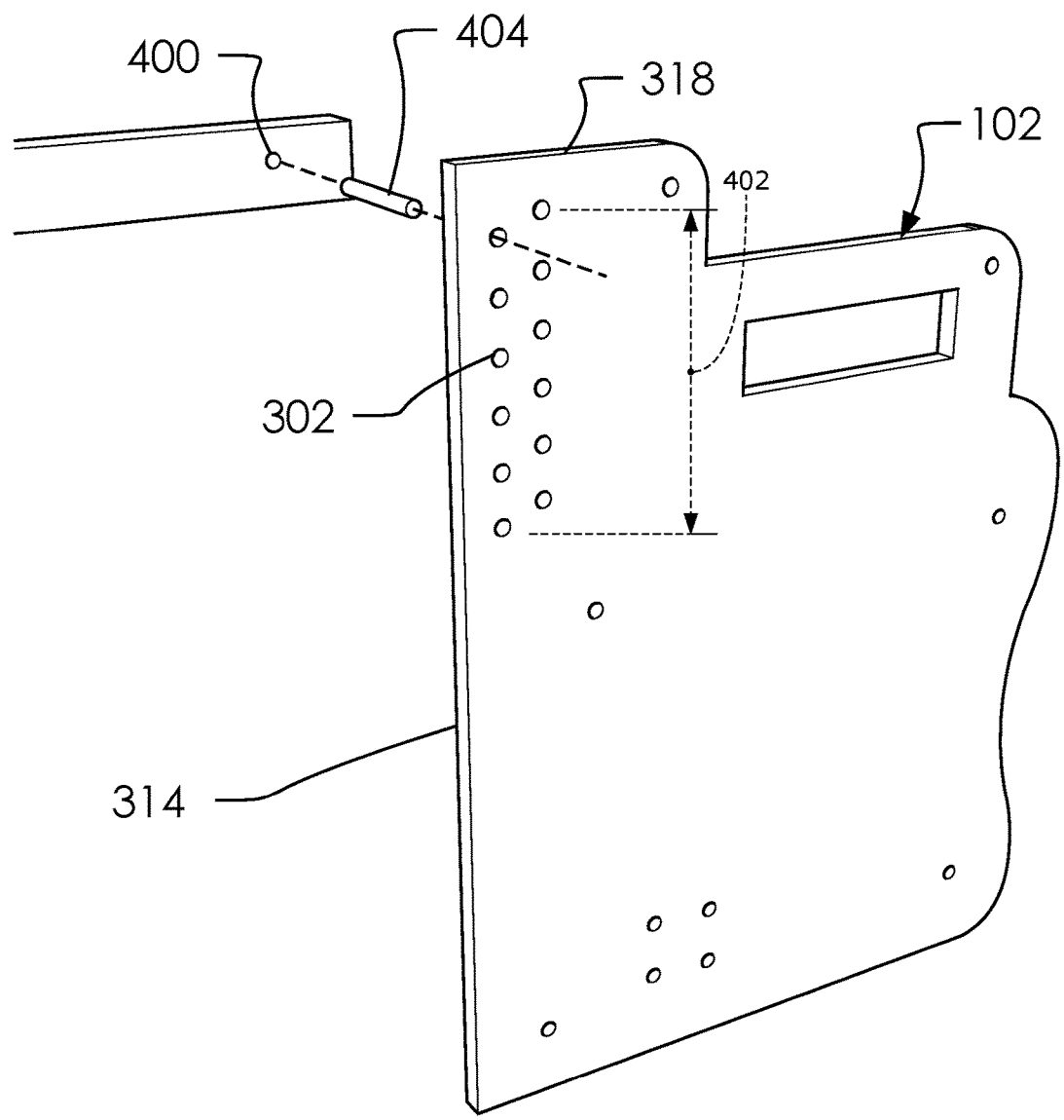
FIG. 4 illustrates said body portion 102 and a picket level indicator 104 in an exploded perspective overview.

FIG. 4 illustrates said body portion 102 and said picket level indicator 104 in an exploded perspective overview.

In one embodiment, said picket level indicator 104 can be selectively attached to said body portion 102 by aligning a portion of one or more level apertures 400 with a portion of said indicator level apertures 302 and attaching a level fastener 404.

In one embodiment, said indicator level apertures 302 can extend along a portion of said first side edge 314 across an indicator height range 402. Whereby, attaching said picket level indicator 104 to said body portion 102 can be accomplished within said indicator height range 402 by selecting a relevant portion of said indicator level apertures 302 when aligning said one or more level apertures 400.

Similarly, a portion of said lower wheel apertures 324 can be selected when attaching said lower guide assembly 202 so as to alter its relative height, as discussed below.

In one embodiment, said level fastener 404 can comprise a quick release pin comprising a bearing and a release setting, as is known in the art.

Figure 5:
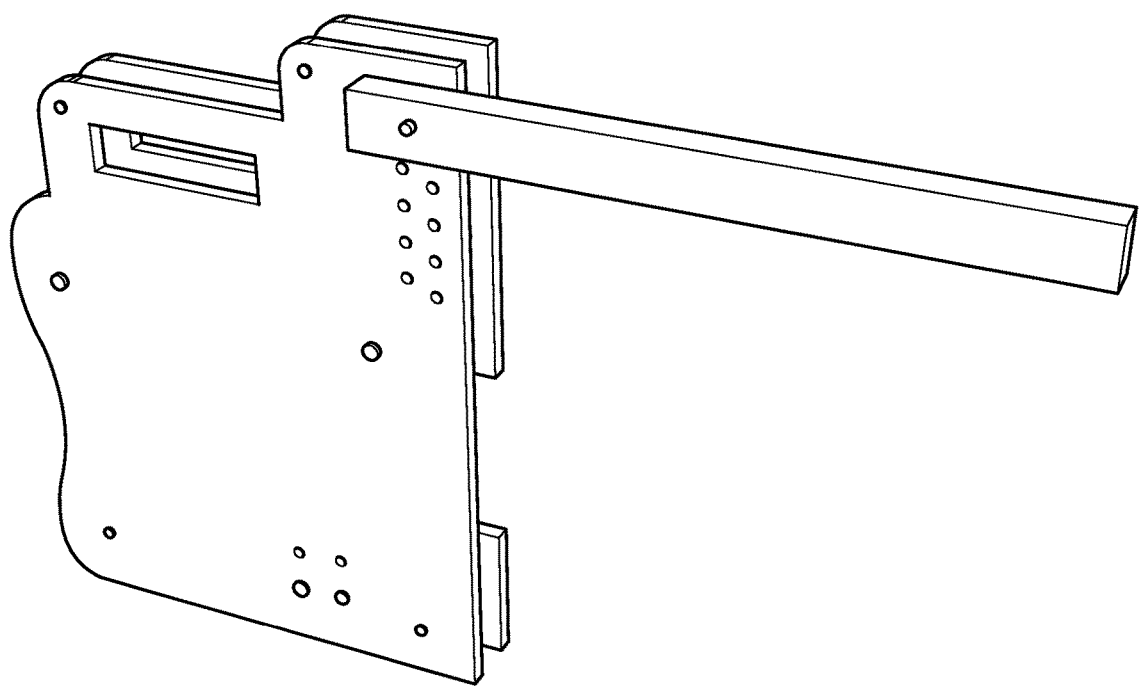
FIG. 5 illustrates a perspective rear view of said alignment tool 100.

FIG. 5 illustrates a perspective rear view of said alignment tool 100.

Figure 6A:
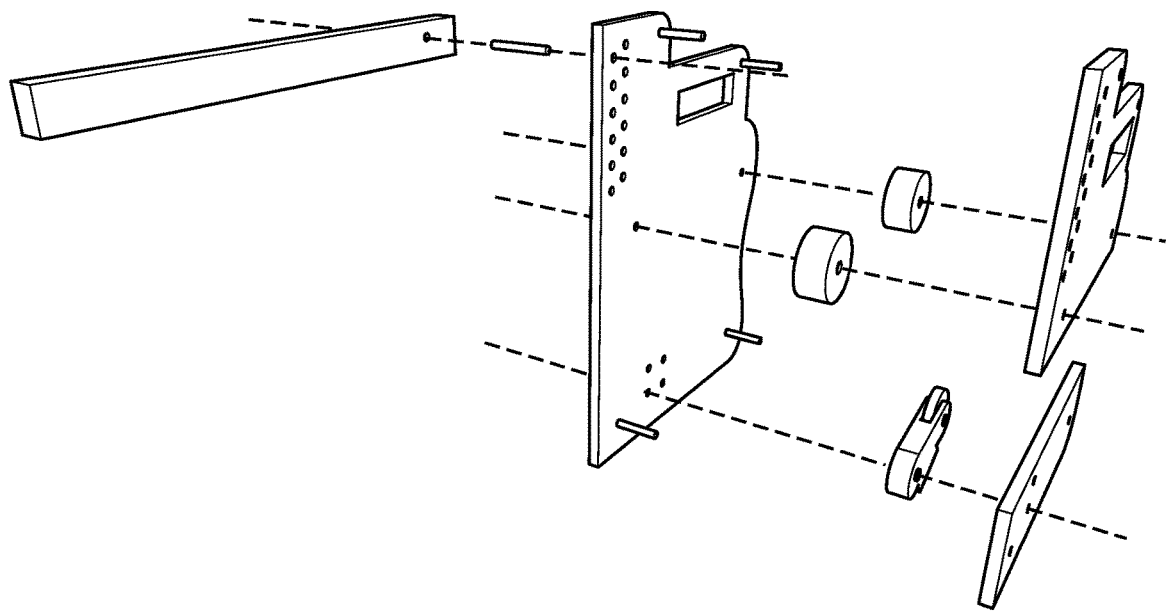
FIGS. 6A, and 6B illustrate an exploded perspective overview of said alignment tool 100 from a front and rear perspective, respectively.
Figure 6B:
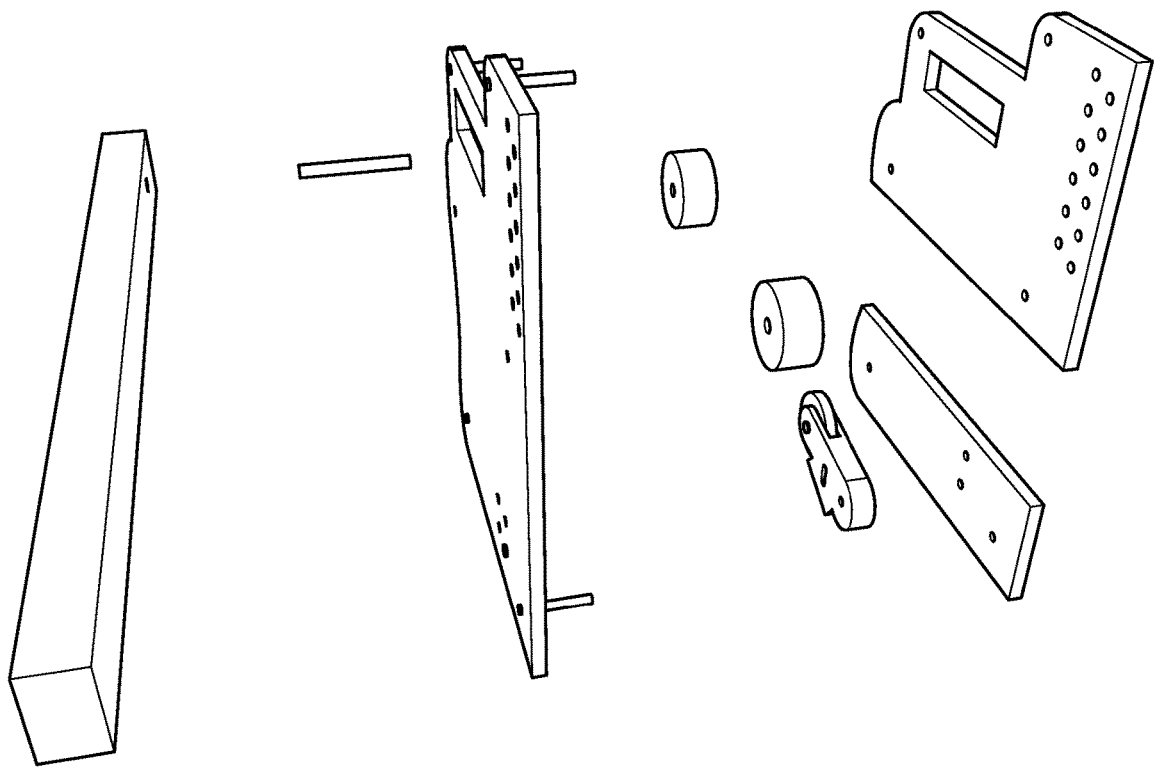

FIGS. 6A, and 6B illustrate an exploded perspective overview of said alignment tool 100 from a front and rear perspective, respectively.

Figure 7A:
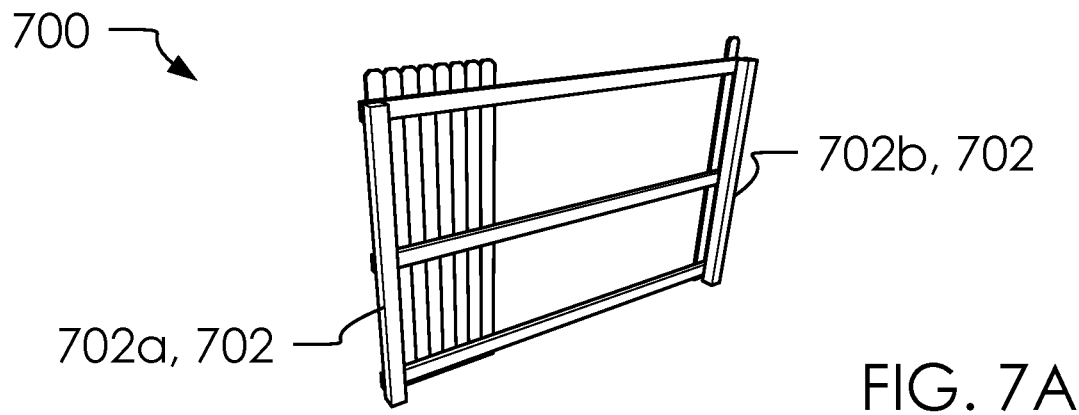
FIGS. 7A, and 7B illustrate a perspective overview of a fence segment 700 in a complete and incomplete configuration.
Figure 7B:
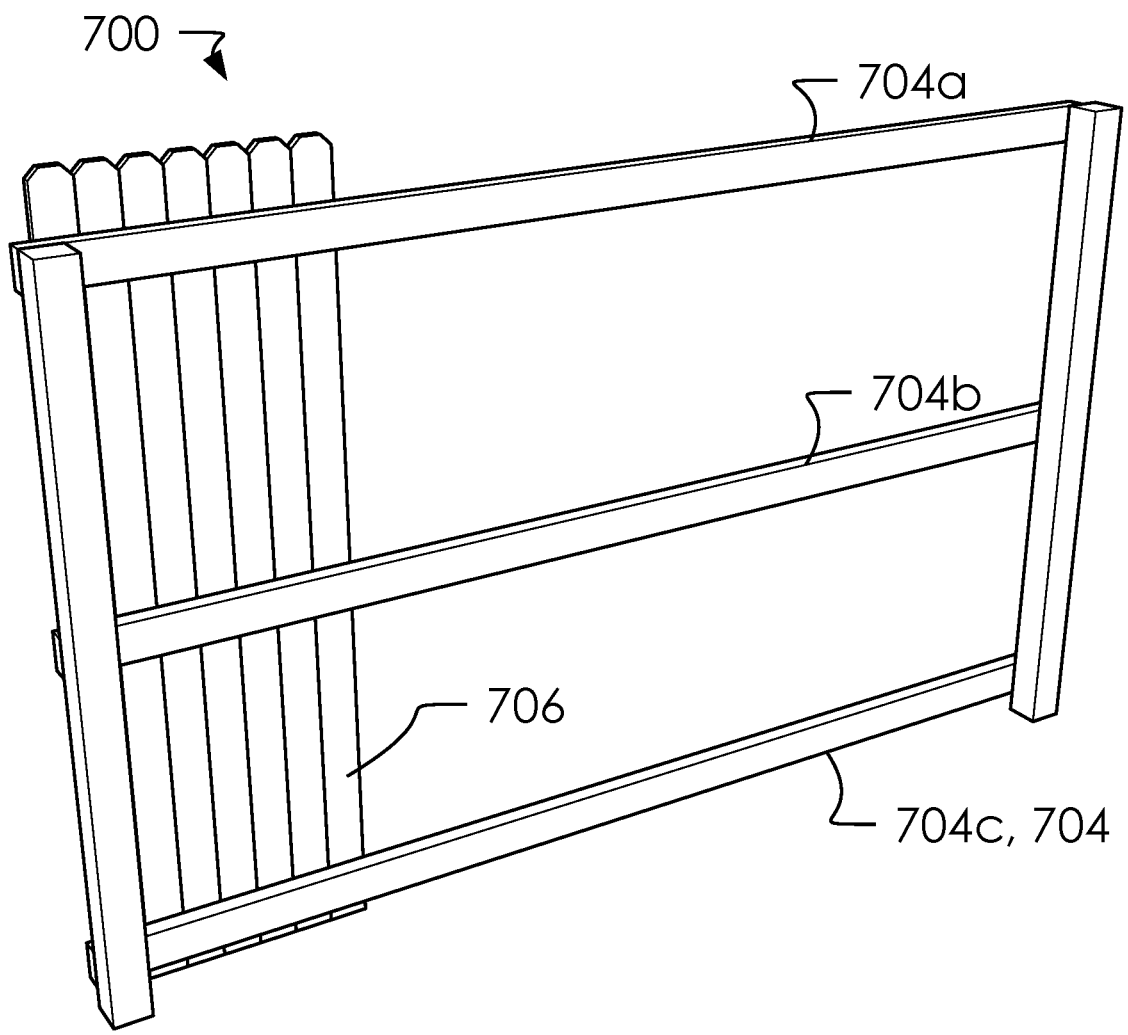

FIGS. 7A, and 7B illustrate a perspective overview of a fence segment 700 in a complete and incomplete configuration.

In one embodiment, said fence segment 700 can comprise two or more posts 702 (which can comprise a first post 702*a*, and a second post 702*b*), one or more cross members 704 (which can comprise a first cross member 704*a*, a second cross member 704*b*, and a third cross member 704*c*), and a plurality of pickets 706.

As is known in the art, said fence segment 700 can be constructed by: securing said two or more posts 702 into the ground in a substantially vertical alignment; attaching said one or more cross members 704 between said two or more posts 702 at various heights, as illustrated; and attaching said plurality of pickets 706 to portions of said one or more cross members 704.

Figure 8:
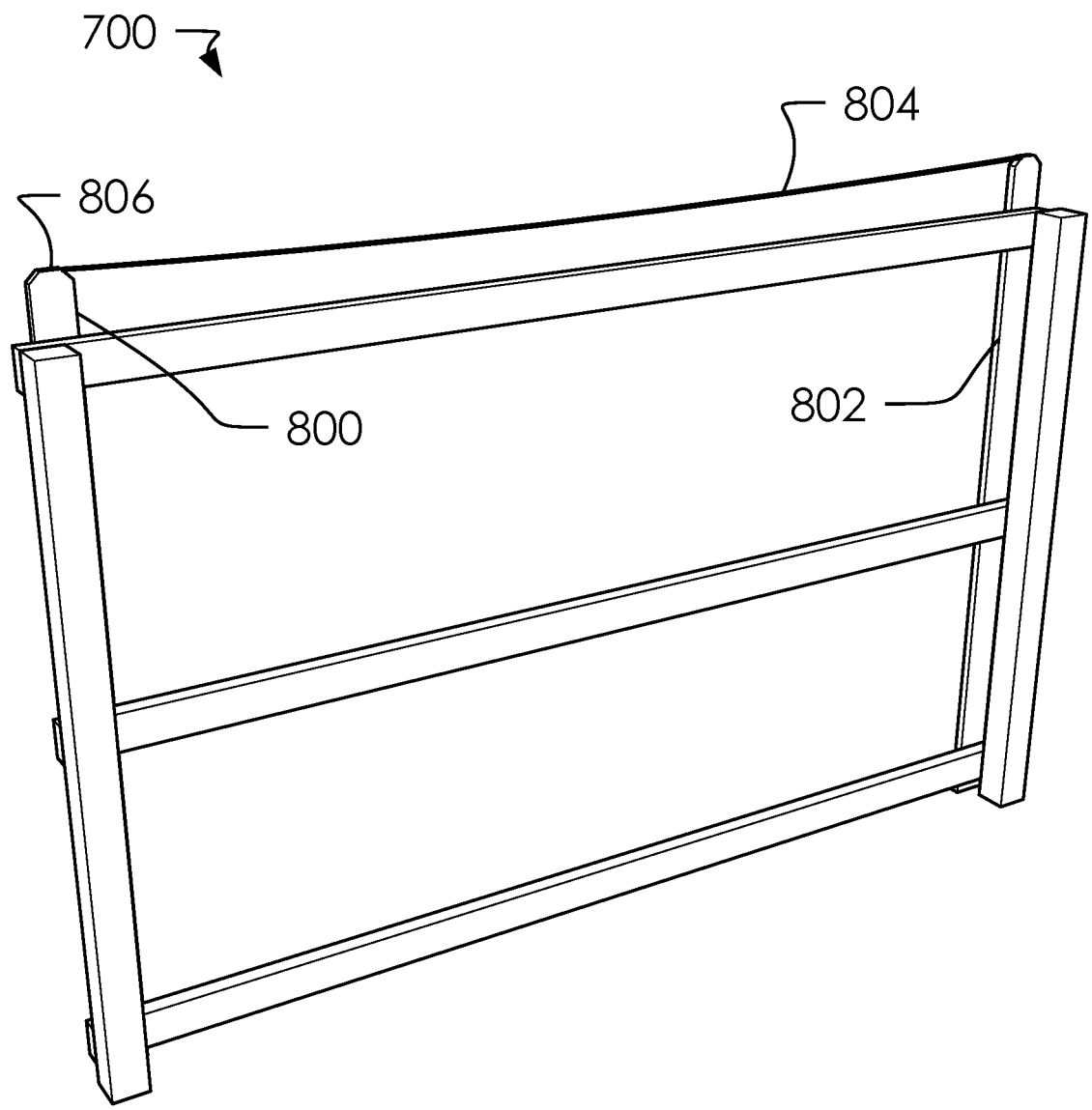
FIG. 8 illustrates a perspective overview of said fence segment 700 during construction without said alignment tool 100.

FIG. 8 illustrates a perspective overview of said fence segment 700 during construction without said alignment tool 100.

In a typical fence construction setting, a builder may have trouble aligning the heights of each among said plurality of pickets 706 with one another. Merely trusting one's own eye when nailing said plurality of pickets 706 into said one or more cross members 704, may lead to a fence with said plurality of pickets 706 being misaligned. Historically, this can be overcome by: installing a first picket 800 and a last picket 802, tying a string 804 between said first picket 800 and said last picket 802, and using said string 804 as a reference point to align a top edge 806 of each subsequent picket while building said fence segment 700.

Trouble arises with this method, however, because said string 804 is prone to sagging (as illustrated), reliant on the correct installation of said first picket 800 and said last picket 802, often stretches and flaps about in the wind, may fall off of said first picket 800, and can be improperly installed.

Accordingly, aligning said plurality of pickets 706 manually or using said string 804 can lead to badly aligned and sloppy workmanship when building said fence segment 700. Said alignment tool 100 can be used to overcome these failures so as to simplify and improve the construction of said fence segment 700.

Figure 9A:
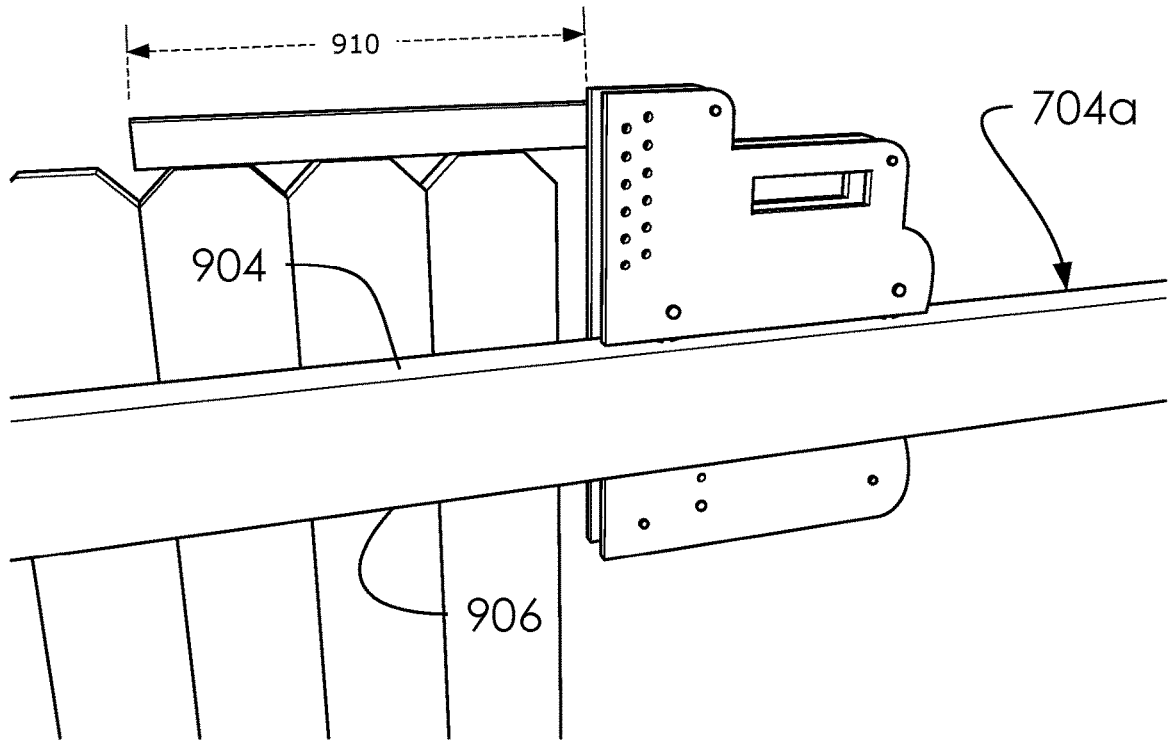
FIGS. 9A, and 9B illustrate a perspective overview of said alignment tool 100 with and without said one or more front plates 106 installed.
Figure 9B:
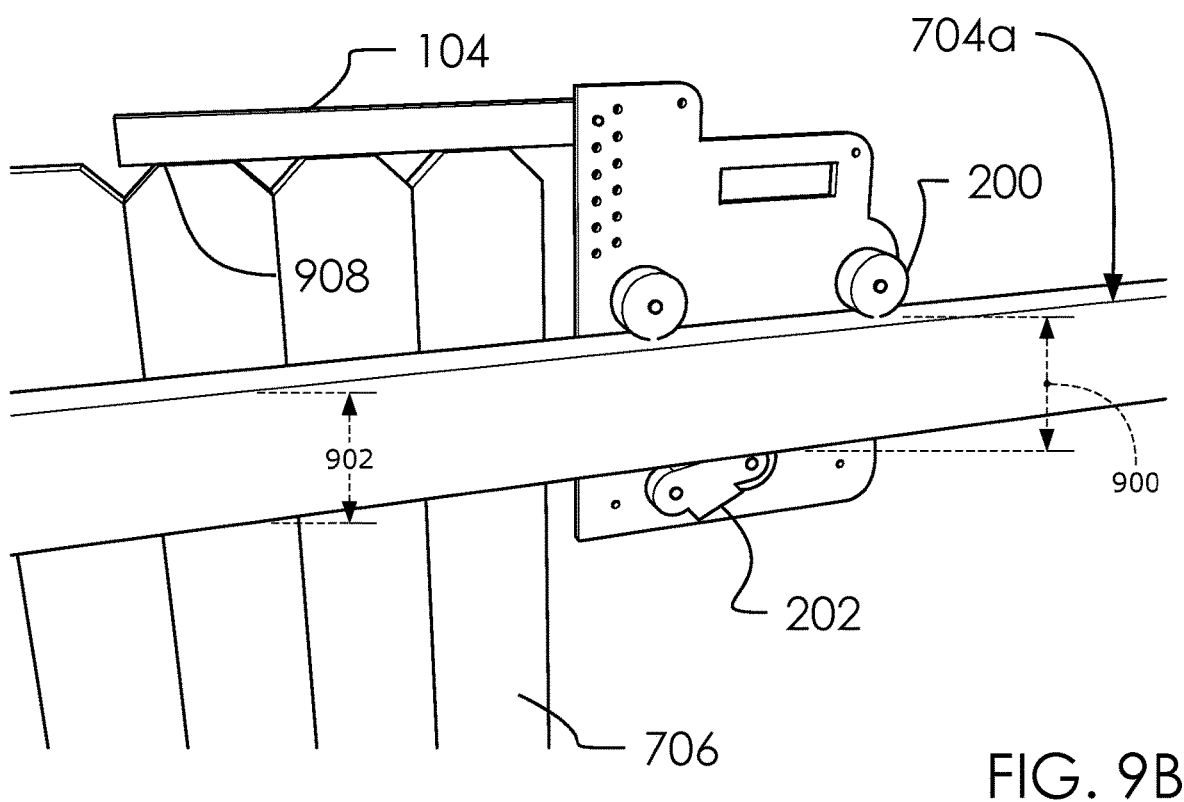

FIGS. 9A, and 9B illustrate a perspective overview of said alignment tool 100 with and without said one or more front plates 106 installed.

In one embodiment, said alignment tool 100 can be selectively attached to said first cross member 704*a* by: adjusting a guide gap 900 between said one or more upper guides 200 and said lower guide assembly 202 to be substantially equal to a first cross member height 902 of said first cross member 704*a*, and squeezing said first cross member 704*a* with said one or more upper guides 200 on a cross member top edge 904 and said lower guide assembly 202 on a cross member bottom edge 906.

Wherein, said alignment tool 100 can be configured to selectively attach to said first cross member 704*a* of said fence segment 700, extend upward with said body portion 102, extend outward without said picket level indicator 104 and define said top edge 806 of said plurality of pickets 706 using a leveler lower edge 908 of said picket level indicator 104.

In one embodiment, said picket level indicator 104 can comprise a level length 910. Said level length 910 can be long enough to install more than one of said plurality of pickets 706 without needing to move said alignment tool 100. For example, as illustrated, said level length 910 is longer than the width of three of said plurality of pickets 706. Accordingly, a workman can set up said alignment tool 100 and install several of said plurality of pickets 706 without needing to adjust said alignment tool 100. In one embodiment, said level length 910 can comprise one foot.

In one embodiment, said picket level indicator 104 can comprise a weight being sufficiently heavy to resist movement when nudged by said plurality of pickets 706 during installation. For example, 104/can be approximately one pound.

Figure 10A:
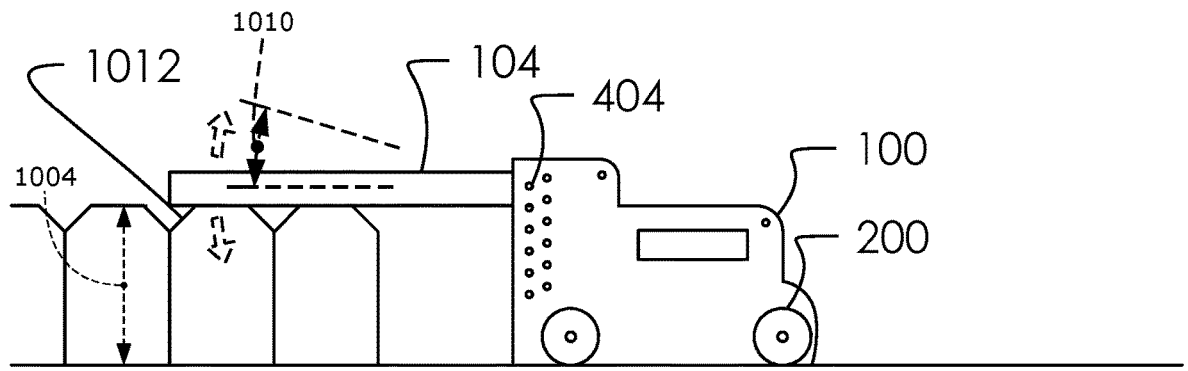
FIGS. 10A, and 10B illustrate an elevated front side view of said alignment tool 100 attaching to and attached to a first cross member 704a of said fence segment 700.
Figure 10B:
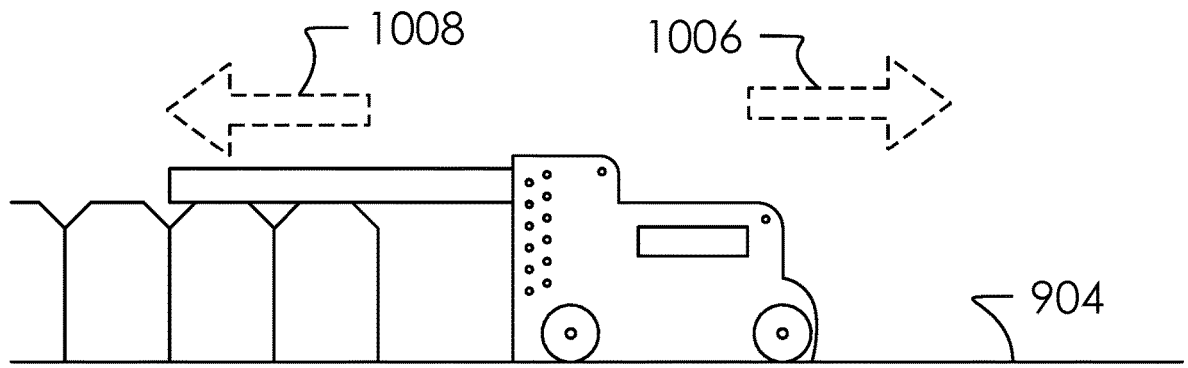

FIGS. 10A, and 10B illustrate an elevated front side view of said alignment tool 100 attaching to and attached to said first cross member 704*a* of said fence segment 700.

In one embodiment, said lower guide assembly 202 can comprise a spring pressure 1000 configured to press a wheel portion 1002 of said lower guide assembly 202 upward when released. In one embodiment, said spring pressure 1000 can press said wheel portion 1002 into said cross member bottom edge 906 of said first cross member 704*a*, as illustrated.

In one embodiment, said one or more upper guides 200 can support a mass of said alignment tool 100 on said first cross member 704*a* and allow said alignment tool 100 to selectively slide among the length of said first cross member 704*a* between said two or more posts 702 in a forward direction 1006 and a reverse direction 1008.

Accordingly, said alignment tool 100 can be configured to selectively and slideably attach to a portion of said first cross member 704*a* and hold said picket level indicator 104 at a selected height 1004 above said first cross member 704*a*.

In one embodiment, said picket level indicator 104 can pivot around an axis created by said level fastener 404 with said picket level indicator 104 attached to said body portion 102. Accordingly, said picket level indicator 104 can rotate in a level adjustment angle 1010. Said alignment tool 100 can be adjusted to match an existing picket 1012 by resting a distal end of said picket level indicator 104 on a most recently installed picket and allowing said picket level indicator 104 to rotate within said level adjustment angle 1010, as illustrated.

Figure 11:
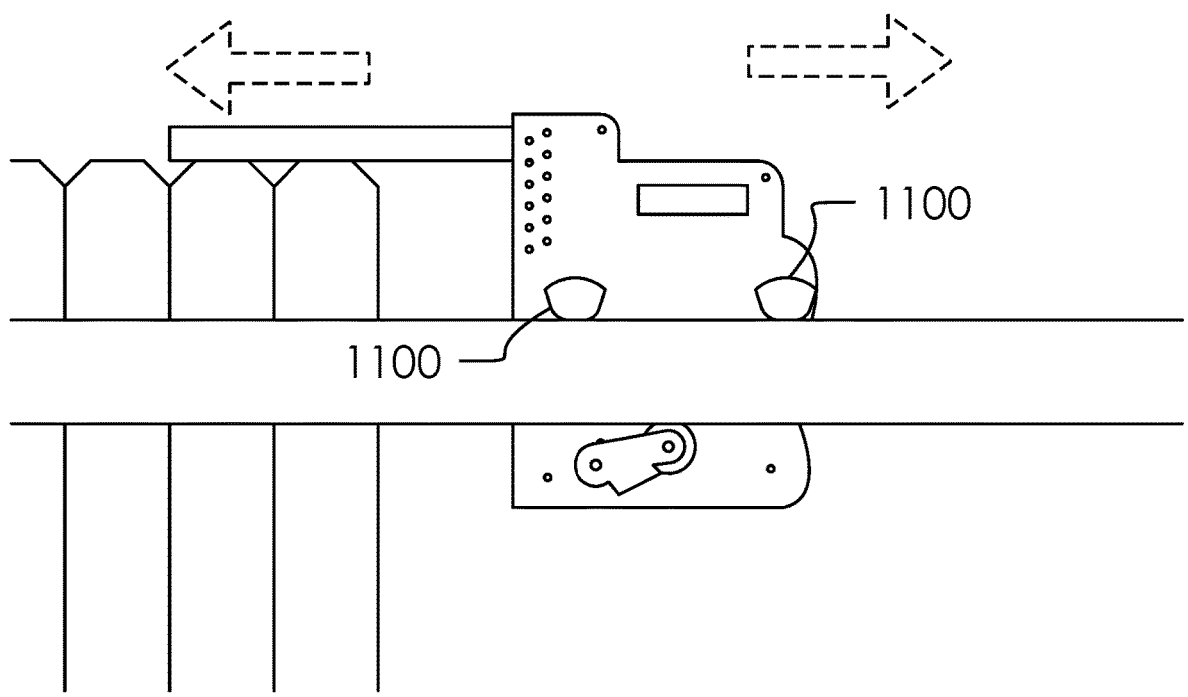
FIG. 11 illustrates an elevated front view of said alignment tool 100 with two sliders 1100 replacing one or more upper guides 200.

FIG. 11 illustrates an elevated front view of said alignment tool 100 with two sliders 1100 replacing said one or more upper guides 200.

In one embodiment, said one or more upper guides 200 can be replaced with said two sliders 1100 rather than said first upper wheel 200*a* and said lower guide assembly 202. Wherein, said alignment tool 100 can slide said forward direction 1006 and said reverse direction 1008 on said two sliders 1100.

In one embodiment, said two sliders 1100 can comprise polyurethane or other material comprising a low coefficient of friction.

In another embodiment, said alignment tool 100 could be clamped on said first cross member 704*a*. This approach has been explored by the Applicant, but slideably attached systems are better adapted to a quick installation of said fence segment 700.

Figure 12:
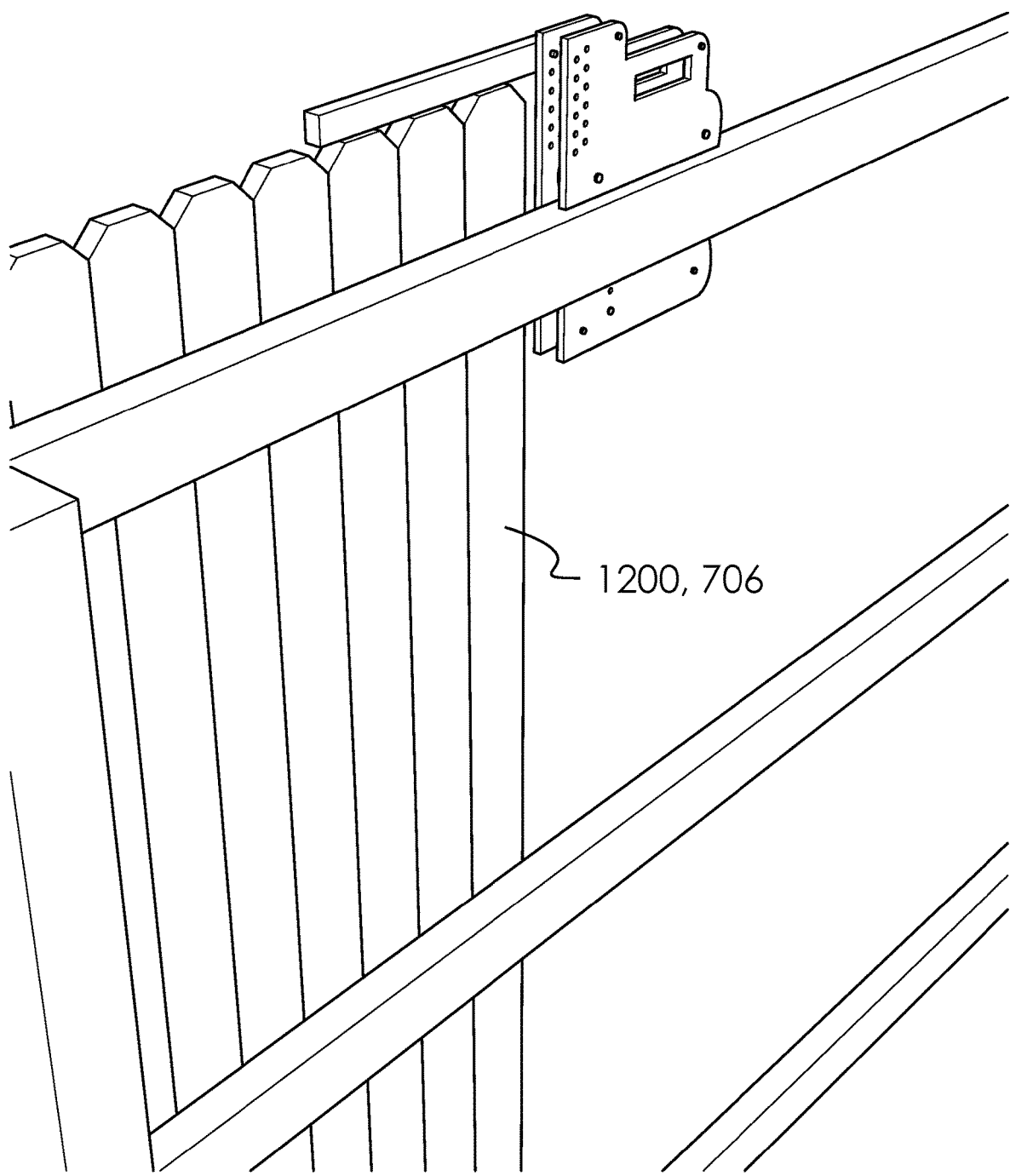
FIG. 12 illustrates a perspective overview of said alignment tool 100 with a new picket 1200 installed on said fence segment 700.

FIG. 12 illustrates a perspective overview of said alignment tool 100 with a new picket 1200 installed on said fence segment 700.

Figure 13:
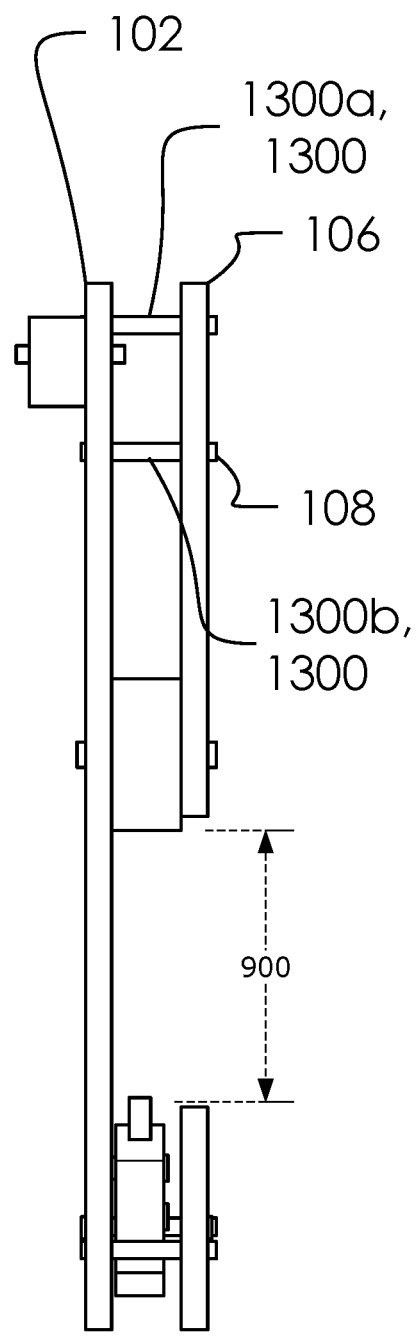
FIG. 13 illustrates an elevated side and front view of said alignment tool 100.

FIG. 13 illustrates an elevated side and front view of said alignment tool 100.

In one embodiment, said body portion 102 and said one or more front plates 106 can be attached to one another by a portion of said one or more fasteners 108, and can be held apart from one another by one or more spacers 1300 (which can comprise a first spacers 1300*a*, and a second spacers 1300*b*).

Figure 14:
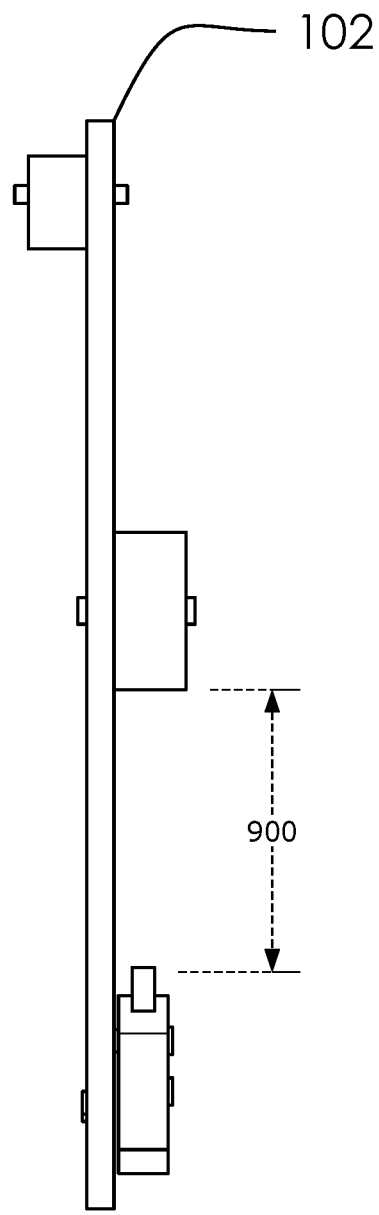
FIG. 14 illustrates an elevated side of said alignment tool 100 without said one or more front plates 106.

FIG. 14 illustrates an elevated side of said alignment tool 100 without said one or more front plates 106.

Figure 15A:
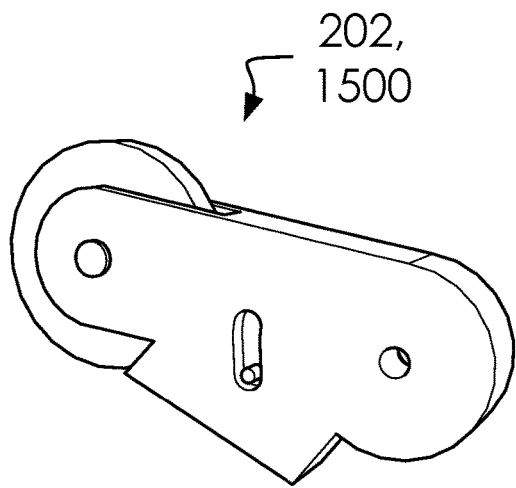
FIGS. 15A, and 15B illustrate a perspective overview of a lower guide assembly 202 in a sprung configuration 1500 and an unsprung configuration 1502.
Figure 15C:
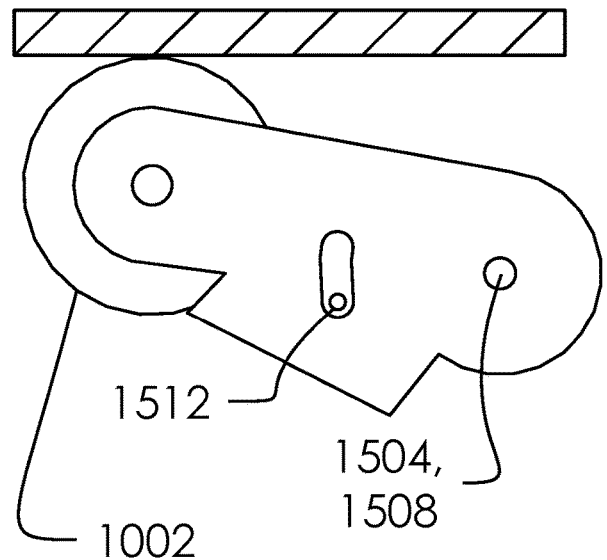
FIGS. 15C and 15D illustrate an elevated side view of said lower guide assembly 202 in said sprung configuration 1500 and said unsprung configuration 1502, respectively.
Figure 15B:
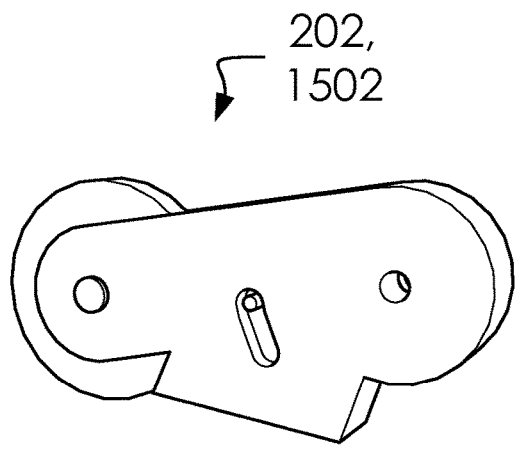
Figure 15D:
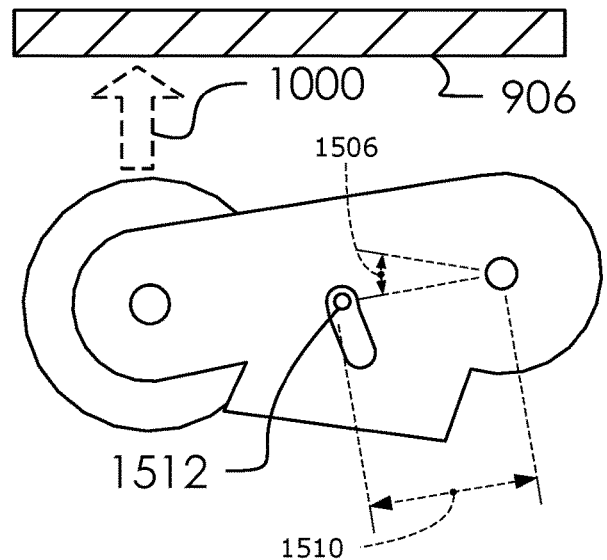

FIGS. 15A, and 15B illustrate a perspective overview of said lower guide assembly 202 in a sprung configuration 1500 and an unsprung configuration 1502. FIGS. 15C and 15D illustrate an elevated side view of said lower guide assembly 202 in said sprung configuration 1500 and said unsprung configuration 1502, respectively.

In one embodiment, said lower guide assembly 202 can be configured to rotate about a rotating axis 1504 within a rotary range of positions 1506. In one embodiment, said lower guide assembly 202 can be attached to said body portion 102 with a rotating axel 1508 being centered around said rotating axis 1504, and a spring fastener 1512 being a radius 1510 away from said rotating axel 1508. Wherein, said spring fastener 1512 and said rotating axel 1508 can attach to said body portion 102 using a portion of said one or more fasteners 108. In one embodiment, a spring mechanism can be contained within a portion of said lower guide assembly 202 applying said spring pressure 1000 on said spring fastener 1512 so as to press said wheel portion 1002 up and into said cross member bottom edge 906, as discussed above.

Spring mechanisms are well known in the art. Spring loaded wheel assemblies can acquired at a typical hardware store and can possibly apply said spring pressure 1000, as is known in the art.

Figure 16:
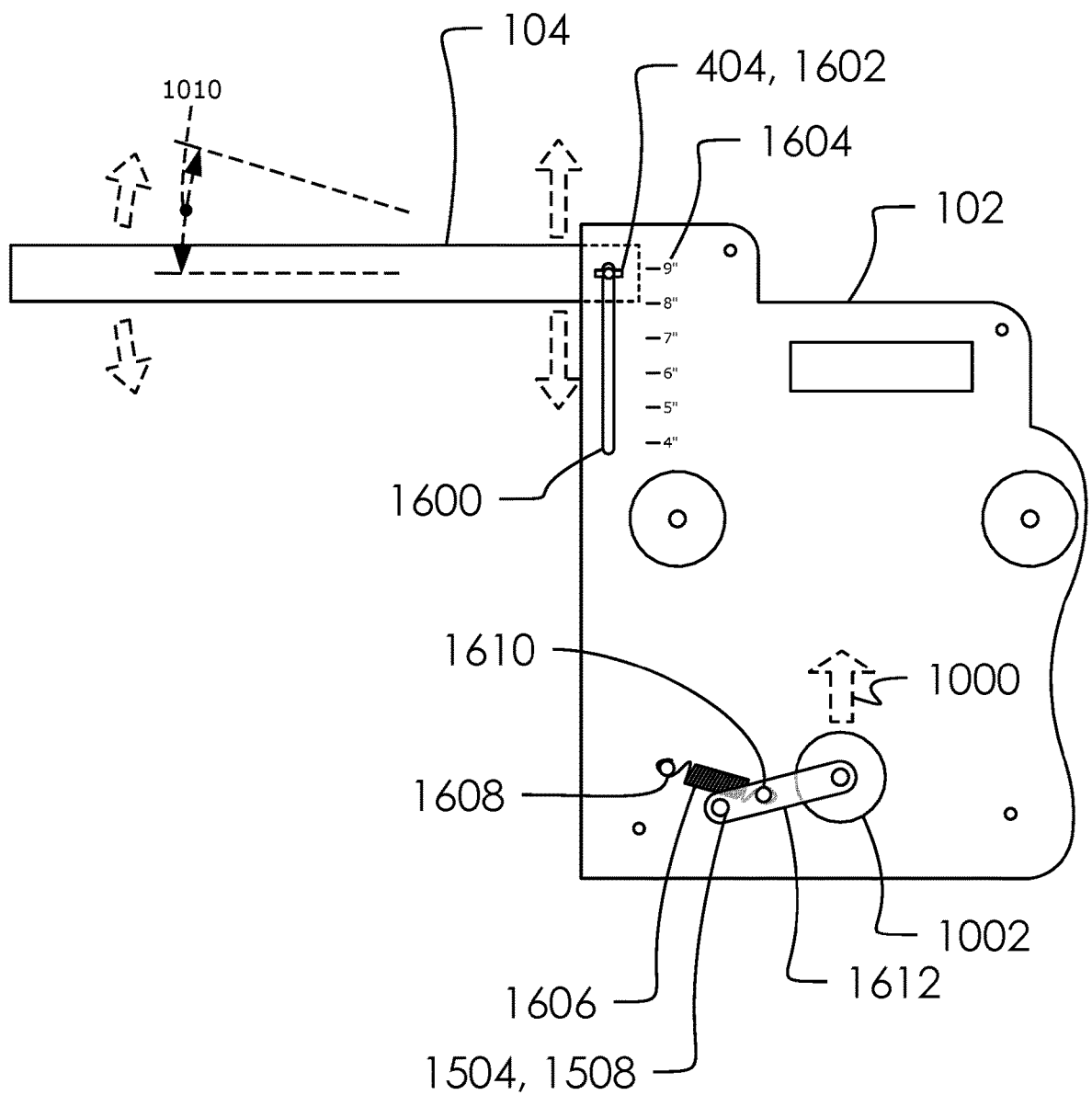
FIG. 16 illustrates an elevated side view of said alignment tool 100 with a modified said lower guide assembly 202 and indicator level apertures 302.

FIG. 16 illustrates an elevated side view of said alignment tool 100 with a modified said lower guide assembly 202 and said indicator level apertures 302.

In one embodiment, said indicator level apertures 302 can comprise an elongated vertical aperture 1600, as illustrated. Wherein, said level fastener 404 can comprise a butterfly fastener assembly 1602 being adapted to tighten within said elongated vertical aperture 1600 at a desired height. Wherein, said picket level indicator 104 can continue to rotate about said level adjustment angle 1010, as discussed above. Further, said body portion 102 can comprise a height indicator 1604 to clarify an installation height above said first cross member 704a.

In one embodiment, said lower guide assembly 202 can comprise an external spring 1606 being attached to a portion of said body portion 102 at a first end 1608 and a portion of said lower guide assembly 202 at a second end 1610. Said lower guide assembly 202 can comprise a lever body 1612 being rotatably attached to said body portion 102 at said rotating axel 1508 with said wheel portion 1002 being pulled with said spring pressure 1000 in a substantially upward direction.

Figure 17A:
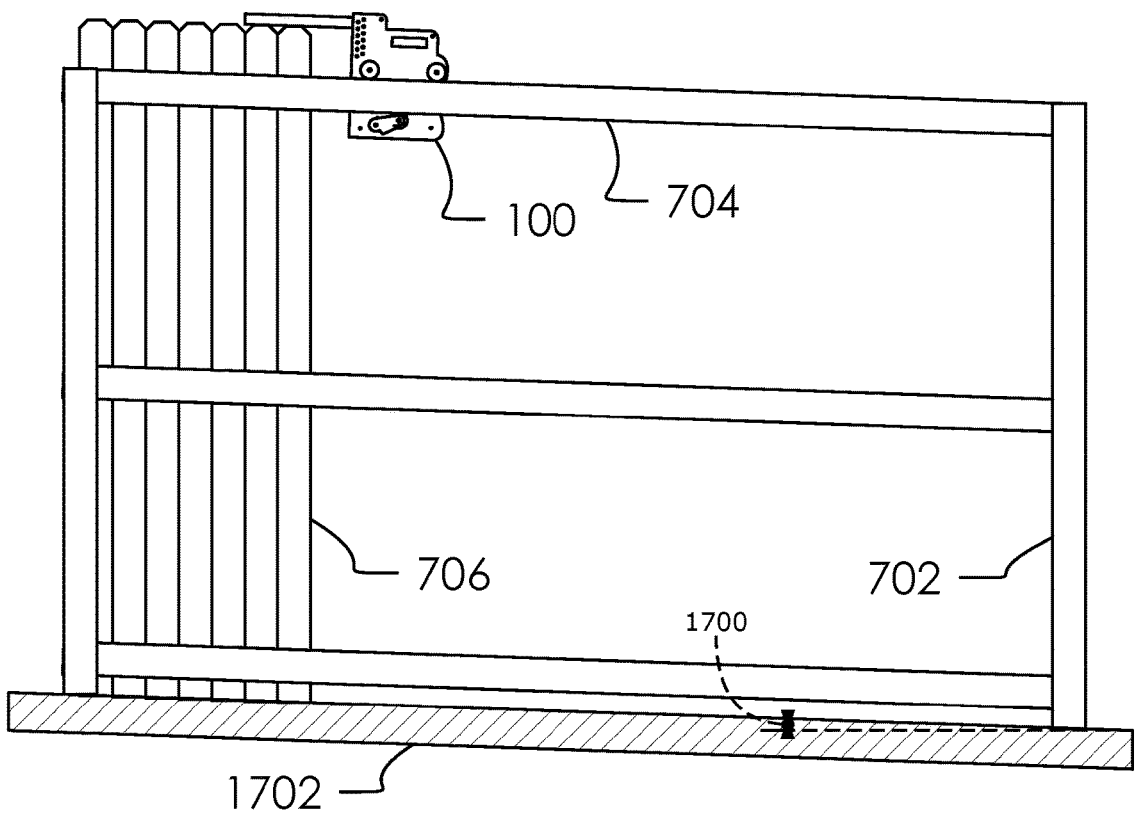
FIGS. 17A, and 17B illustrate an elevated side view of said fence segment 700 on an uneven surface and a detailed view of said alignment tool 100 in use where one or more cross members 704 are not level.
Figure 17B:
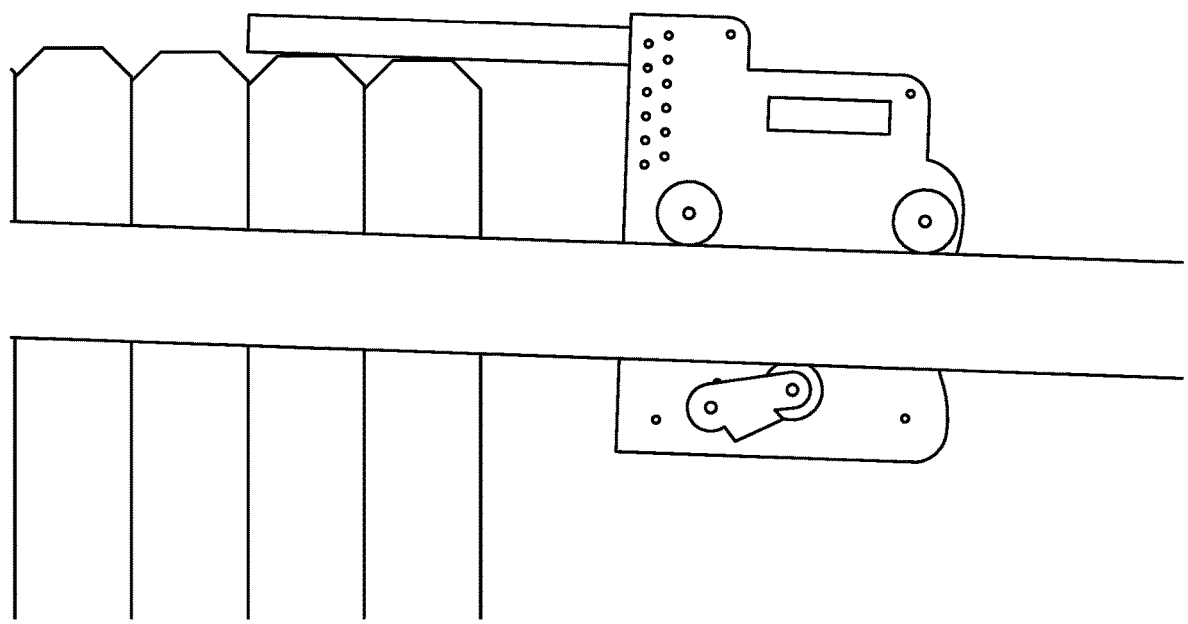

FIGS. 17A, and 17B illustrate an elevated side view of said fence segment 700 on an uneven surface and a detailed view of said alignment tool 100 in use where said one or more cross members 704 are not level.

In one embodiment, said fence segment 700 can be installed on a non-horizontal ground surface, wherein, said two or more posts 702 are at different elevations relative to one another. Further wherein, said one or more cross members 704 are not horizontal and said plurality of pickets 706 will be installed a different levels so a to match a ground angle 1700 of a ground surface 1702.

Wherein, since said alignment tool 100 is configured to extend said picket level indicator 104 out at a substantially parallel plane with said one or more cross members 704, said top edge 806 of each among said plurality of pickets 706 will substantially follow said ground angle 1700.

The following is a listing of the parts referred to above and in the figures:
said alignment tool 100,
said body portion 102,
said picket level indicator 104,
said one or more front plates 106,
said first front plate 106a,
said second front plate 106b,
said one or more fasteners 108,
said one or more upper guides 200,
said first upper wheel 200a,
said second upper wheel 200b,
said lower guide assembly 202,
said plurality of apertures 300,
said indicator level apertures 302,
said plate spacer apertures 304,
said wheel axel apertures 306,
said front side 310,
said back side 312,
said first side edge 314,
said second side edge 316,
said top edge 318,
said bottom edge 320,
said upper wheel apertures 322,
said lower wheel apertures 324,
said handle 326,
said one or more level apertures 400,
said indicator height range 402,
said level fastener 404,
said fence segment 700,
said two or more posts 702,
said first post 702a,
said second post 702b,
said one or more cross members 704,
said first cross member 704a,
said second cross member 704b,
said third cross member 704c,
said plurality of pickets 706,
said first picket 800,
said last picket 802,
said string 804,
said top edge 806,
said guide gap 900,
said first cross member height 902,
said cross member top edge 904,
said cross member bottom edge 906,
said leveler lower edge 908,
said level length 910,
said spring pressure 1000,
said wheel portion 1002,
said selected height 1004,
said forward direction 1006,
said reverse direction 1008,
said level adjustment angle 1010,
said existing picket 1012,
said two sliders 1100,
said new picket 1200,
said one or more spacers 1300,
said first spacers 1300a,
said second spacers 1300b,
said sprung configuration 1500,
said unsprung configuration 1502,
said rotating axis 1504,
said rotary range of positions 1506,
said rotating axel 1508,
said radius 1510,
said spring fastener 1512,
said elongated vertical aperture 1600,
said butterfly fastener assembly 1602,
said height indicator 1604,
said external spring 1606, said first end 1608,
said second end 1610,
said lever body 1612,
said ground angle 1700 and
said ground surface 1702.

The following paragraphs summarize the original claims and can be read as a preferred embodiment for the current application.

Said alignment tool 100 for aligning and installing said plurality of pickets 706 on said fence segment 700. Said alignment tool 100 comprises said body portion 102, and said picket level indicator 104. Said one or more upper guides 200 and said lower guide assembly 202 can be separated by said guide gap 900. Said guide gap 900 can be at least as wide as said first cross member height 902 of said first cross member 704a of said fence segment 700. Said alignment tool 100 can be configured to selectively attach and slide along said first cross member 704a of said fence segment 700 and position said picket level indicator 104 at said selected height 1004 relative to said first cross member 704a. Said one or more upper guides 200 and said lower guide assembly 202 can be configured to slide said forward direction 1006 and said reverse direction 1008 on said first cross member 704a. Said alignment tool 100 can be selectively attached to said first cross member 704a by: adjusting said guide gap 900 between said one or more upper guides 200 and said lower guide assembly 202 to be substantially equal to said first cross member height 902 of said first cross member 704a, and squeezing said first cross member 704a with said one or more upper guides 200 on said cross member top edge 904 and said lower guide assembly 202 on said cross member bottom edge 906. a portion of said one or more upper guides 200 and said lower guide assembly 202 comprises a wheel configured to roll across a surface. Said one or more upper guides 200 comprises said first upper wheel 200a, and said second upper wheel 200b. said alignment tool (100) can be configured for aligning and installing said plurality of pickets 706 on said fence segment 700 by: selectively attaching to said first cross member 704a of said fence segment 700, extending upward with said body portion 102 from said one or more upper guides 200, extending outward from said body portion 102 without said picket level indicator 104 and defining said top edge 806 of said plurality of pickets 706 using said leveler lower edge 908 of said picket level indicator 104 at said selected height 1004. Said lower guide assembly 202 comprises said spring pressure 1000 configured to press said wheel portion 1002 of said lower guide assembly 202 upward when released. Said spring pressure 1000 can be configured to press said wheel portion 1002 into said cross member bottom edge 906 of said first cross member 704a. Said one or more upper guides 200 can be configured to support a mass of said alignment tool 100 on said first cross member 704a and allow said alignment tool 100 to selectively slide among the length of said first cross member 704a between said two or more posts 702 in said forward direction 1006 and said reverse direction 1008. Said alignment tool 100 can be configured to selectively and slideably attach to a portion of said first cross member 704a and hold said picket level indicator 104 at said selected height 1004 above said first cross member 704a.

Said alignment tool 100 for aligning and installing said plurality of pickets 706 on said fence segment 700. Said alignment tool 100 comprises said body portion 102, and said picket level indicator 104. Said one or more upper guides 200 and said lower guide assembly 202 can be separated by said guide gap 900. Said guide gap 900 can be at least as wide as said first cross member height 902 of said first cross member 704a of said fence segment 700. Said alignment tool 100 can be configured to selectively attach and slide along said first cross member 704a of said fence segment 700 and position said picket level indicator 104 at said selected height 1004 relative to said first cross member 704a. Said one or more upper guides 200 and said lower guide assembly 202 can be configured to slide said forward direction 1006 and said reverse direction 1008 on said first cross member 704a. Said alignment tool 100 can be selectively attached to said first cross member 704a by: adjusting said guide gap 900 between said one or more upper guides 200 and said lower guide assembly 202 to be substantially equal to said first cross member height 902 of said first cross member 704a, and squeezing said first cross member 704a with said one or more upper guides 200 on said cross member top edge 904 and said lower guide assembly 202 on said cross member bottom edge 906.

Said lower guide assembly 202 and said one or more upper guides 200 comprises said two sliders 1100. Said two sliders 1100 can be configured to slide said forward direction 1006 and said reverse direction 1008 on said two sliders 1100 over said first cross member 704a.

a portion of said one or more upper guides 200 and said lower guide assembly 202 comprises a wheel configured to roll across a surface.

Said one or more upper guides 200 comprises said first upper wheel 200a, and said second upper wheel 200b.

Said picket level indicator 104 can be selectively attached to said body portion 102 by aligning a portion of said one or more level apertures 400 with a portion of said indicator level apertures 302 and attaching said one or more fasteners 108. Said body portion 102 comprises said plurality of apertures 300 which comprises said indicator level apertures 302, said plate spacer apertures 304, and said wheel axel apertures 306. Said body portion 102 comprises said front side 310, said back side 312, said first side edge 314, said second side edge 316, said top edge 318, and said bottom edge 320. Said indicator level apertures 302 comprises a plurality of apertures proximate to said first side edge 314 and said top edge 318. Said wheel axel apertures 306 comprises said upper wheel apertures 322 configured to connect to said one or more upper guides 200. Said wheel axel apertures 306 can be configured to further comprise said lower wheel apertures 324 configured to connect to said lower guide assembly 202. Said alignment tool 100 comprises said handle 326, which comprises an aperture in a portion of said body portion 102, such as proximate to said top edge 318.

Said alignment tool 100 can be configured for aligning and installing said plurality of pickets 706 on said fence segment 700 by: selectively attaching to said first cross member 704a of said fence segment 700, extending upward with said body portion 102 from said one or more upper guides 200, extending outward from said body portion 102 without said picket level indicator 104 and defining said top edge 806 of said plurality of pickets 706 using said leveler lower edge 908 of said picket level indicator 104 at said selected height 1004.

Said lower guide assembly 202 comprises said spring pressure 1000 configured to press said wheel portion 1002 of said lower guide assembly 202 upward when released. Said spring pressure 1000 can be configured to press said wheel portion 1002 into said cross member bottom edge 906 of said first cross member 704a.

Said lower guide assembly 202 can be configured to rotate about said rotating axis 1504 within said rotary range of positions 1506. Said lower guide assembly 202 can be attached to said body portion 102 with said rotating axel 1508 being centered around said rotating axis 1504, and said spring fastener 1512 being said radius 1510 away from said rotating axel 1508. Said spring fastener 1512 and said rotating axel 1508 can be configured to attach to said body portion 102 using a portion of said one or more fasteners 108. a spring mechanism can be contained within a portion of said lower guide assembly 202 applying said spring pressure 1000 on said spring fastener 1512 so as to press said wheel portion 1002 up and into said cross member bottom edge 906.

Said one or more upper guides 200 can be configured to support a mass of said alignment tool 100 on said first cross member 704a and allow said alignment tool 100 to selectively slide among the length of said first cross member 704a between said two or more posts 702 in said forward direction 1006 and said reverse direction 1008. Said alignment tool 100 can be configured to selectively and slideably attach to a portion of said first cross member 704a and hold said picket level indicator 104 at said selected height 1004 above said first cross member 704a.

Said body portion 102 and said one or more front plates 106 can be attached to one another by a portion of said one or more fasteners 108, and can be held apart from one another by said one or more spacers 1300.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An alignment tool for aligning and installing a plurality of pickets on a fence segment, wherein:
    said alignment tool comprises a body portion, and a picket level indicator;
    one or more upper guides and a lower guide assembly can be separated by a guide gap;
    said guide gap is at least as wide as a first cross member height of a first cross member of said fence segment;
    said alignment tool is configured to selectively attach and slide along said first cross member of said fence segment and position said picket level indicator at a selected height relative to said first cross member;
    said one or more upper guides and said lower guide assembly are configured to slide a forward direction and a reverse direction on said first cross member;
    said alignment tool is selectively attached to said first cross member by:
        adjusting said guide gap between said one or more upper guides and said lower guide assembly to be substantially equal to said first cross member height of said first cross member, and
        squeezing said first cross member with said one or more upper guides on a cross member top edge and said lower guide assembly on a cross member bottom edge;
    a portion of said one or more upper guides and said lower guide assembly comprises a wheel configured to roll across a surface;
    said one or more upper guides comprises a first upper wheel, and a second upper wheel;
    said alignment tool is configured for aligning and installing said plurality of pickets on said fence segment by:
        selectively attaching to said first cross member of said fence segment,
        extending upward with said body portion from said one or more upper guides,
        extending outward from said body portion without said picket level indicator and
        defining a top edge of said plurality of pickets using a leveler lower edge of said picket level indicator at said selected height;
    said lower guide assembly comprises a spring pressure configured to press a wheel portion of said lower guide assembly upward when released;
    said spring pressure is configured to press said wheel portion into said cross member bottom edge of said first cross member;
    said one or more upper guides is configured to support a mass of said alignment tool on said first cross member and allow said alignment tool to selectively slide among the length of said first cross member between two or more posts in said forward direction and said reverse direction; and
    said alignment tool is configured to selectively and slideably attach to a portion of said first cross member and hold said picket level indicator at said selected height above said first cross member.

2. An alignment tool for aligning and installing a plurality of pickets on a fence segment, wherein:
    said alignment tool comprises a body portion, and a picket level indicator;
    one or more upper guides and a lower guide assembly can be separated by a guide gap;
    said guide gap is at least as wide as a first cross member height of a first cross member of said fence segment;
    said alignment tool is configured to selectively attach and slide along said first cross member of said fence segment and position said picket level indicator at a selected height relative to said first cross member;
    said one or more upper guides and said lower guide assembly are configured to slide a forward direction and a reverse direction on said first cross member;
    said alignment tool is selectively attached to said first cross member by:
        adjusting said guide gap between said one or more upper guides and said lower guide assembly to be substantially equal to said first cross member height of said first cross member, and
        squeezing said first cross member with said one or more upper guides on a cross member top edge and said lower guide assembly on a cross member bottom edge.

3. The alignment tool of claim 2, wherein:
    said lower guide assembly and said one or more upper guides comprises two sliders; and
    said two sliders are configured to slide said forward direction and said reverse direction on said two sliders over said first cross member.

4. The alignment tool of claim 2, wherein:
a portion of said one or more upper guides and said lower guide assembly comprises a wheel configured to roll across a surface.

5. The alignment tool of claim 4, wherein:
said one or more upper guides comprises a first upper wheel, and a second upper wheel.

6. The alignment tool of claim 2, wherein:
said picket level indicator is selectively attached to said body portion by aligning a portion of one or more level apertures with a portion of indicator level apertures and attaching one or more fasteners;
said body portion comprises a plurality of apertures which comprises said indicator level apertures, plate spacer apertures, and wheel axel apertures;
said body portion comprises a front side, a back side, a first side edge, a second side edge, a top edge, and a bottom edge;
said indicator level apertures comprises a plurality of apertures proximate to said first side edge and said top edge;
said wheel axel apertures comprises upper wheel apertures configured to connect to said one or more upper guides; said wheel axel apertures is configured to further comprise lower wheel apertures configured to connect to said lower guide assembly; and
said alignment tool comprises a handle, which comprises an aperture in a portion of said body portion, such as proximate to said top edge.

7. The alignment tool of claim 2, wherein:
said alignment tool is configured for aligning and installing said plurality of pickets on said fence segment by:
selectively attaching to said first cross member of said fence segment,
extending upward with said body portion from said one or more upper guides,
extending outward from said body portion without said picket level indicator and
defining a top edge of said plurality of pickets using a leveler lower edge of said picket level indicator at said selected height.

8. The alignment tool of claim 2, wherein:
said lower guide assembly comprises a spring pressure configured to press a wheel portion of said lower guide assembly upward when released; and
said spring pressure is configured to press said wheel portion into said cross member bottom edge of said first cross member.

9. The alignment tool of claim 8, wherein:
said lower guide assembly is configured to rotate about a rotating axis within a rotary range of positions;
said lower guide assembly is attached to said body portion with a rotating axel being centered around said rotating axis, and a spring fastener being a radius away from said rotating axel;
said spring fastener and said rotating axel is configured to attach to said body portion using a portion of said one or more fasteners; and
a spring mechanism is contained within a portion of said lower guide assembly applying said spring pressure on said spring fastener so as to press said wheel portion up and into said cross member bottom edge.

10. The alignment tool of claim 2, wherein:
said one or more upper guides is configured to support a mass of said alignment tool on said first cross member and allow said alignment tool to selectively slide among the length of said first cross member between two or more posts in said forward direction and said reverse direction; and
said alignment tool is configured to selectively and slideably attach to a portion of said first cross member and hold said picket level indicator at said selected height above said first cross member.

11. The alignment tool of claim 2, wherein:
said body portion and one or more front plates is attached to one another by a portion of said one or more fasteners, and is held apart from one another by one or more spacers.

12. The alignment tool of claim 2, wherein:
said indicator level apertures comprises an elongated vertical aperture;
wherein, a level fastener comprises a butterfly fastener assembly being adapted to tighten within said elongated vertical aperture at a desired height;
wherein, said picket level indicator is configured to continue to rotate about a level adjustment angle, as discussed above; and
further, said body portion comprises a height indicator to clarify an installation height above said first cross member.

13. The alignment tool of claim 2, wherein:
said lower guide assembly comprises an external spring being attached to a portion of said body portion at a first end and a portion of said lower guide assembly at a second end; and
said lower guide assembly comprises a lever body being rotatably attached to said body portion at said rotating axel with said wheel portion being pulled with said spring pressure in a substantially upward direction.

14. The alignment tool of claim 2, wherein:
a portion of said one or more upper guides and said lower guide assembly comprises a wheel configured to roll across a surface;
said one or more upper guides comprises said first upper wheel, and said second upper wheel;
said lower guide assembly comprises said spring pressure configured to press said wheel portion of said lower guide assembly upward when released;
said spring pressure is configured to press said wheel portion into said cross member bottom edge of said first cross member;
said one or more upper guides is configured to support a mass of said alignment tool on said first cross member and allow said alignment tool to selectively slide among the length of said first cross member between said two or more posts in said forward direction and said reverse direction; and
said alignment tool is configured to selectively and slideably attach to a portion of said first cross member and hold said picket level indicator at said selected height above said first cross member.

15. The alignment tool of claim 14, wherein:
said indicator level apertures comprises said elongated vertical aperture;
wherein, said level fastener comprises said butterfly fastener assembly being adapted to tighten within said elongated vertical aperture at a desired height;
wherein, said picket level indicator is configured to continue to rotate about said level adjustment angle, as discussed above; and
further, said body portion comprises said height indicator to clarify an installation height above said first cross member.

16. The alignment tool of claim 14, wherein:
said lower guide assembly comprises said external spring being attached to a portion of said body portion at said first end and a portion of said lower guide assembly at said second end; and
said lower guide assembly comprises said lever body being rotatably attached to said body portion at said rotating axel with said wheel portion being pulled with said spring pressure in a substantially upward direction.

17. The alignment tool of claim 14, wherein:
said picket level indicator is configured to pivot around an axis created by said level fastener with said picket level indicator attached to said body portion;
said picket level indicator is configured to rotate in said level adjustment angle; and
said alignment tool is adjusted to match an existing picket by resting a distal end of said picket level indicator on a most recently installed picket and allowing said picket level indicator to rotate within said level adjustment angle.

18. The alignment tool of claim 2, wherein:
said picket level indicator is configured to pivot around an axis created by said level fastener with said picket level indicator attached to said body portion;
said picket level indicator is configured to rotate in said level adjustment angle; and
said alignment tool is adjusted to match said existing picket by resting a distal end of said picket level indicator on a most recently installed picket and allowing said picket level indicator to rotate within said level adjustment angle.

* * * * *